United States Patent [19]

Sadeh et al.

[11] Patent Number: 5,537,946
[45] Date of Patent: Jul. 23, 1996

[54] APPARATUS AND METHOD FOR PREPARATION OF A SEWING PROGRAM

[75] Inventors: Yaacov Sadeh, Nes Ziona; Yaacov Makover, Rechovot; Bar-Cochva Mardix, Ramat Gan, all of Israel

[73] Assignee: Orisol Original Solutions Ltd., Israel

[21] Appl. No.: 219,845

[22] Filed: Mar. 30, 1994

[51] Int. Cl.⁶ ................................................. D05B 21/00
[52] U.S. Cl. ................... 112/475.03; 112/470.07; 112/475.05; 382/111; 382/266
[58] Field of Search .................. 112/475.05, 475.02, 112/470.07, 470.06, 475.03, 470.04; 382/266, 111, 174, 254

[56] References Cited

U.S. PATENT DOCUMENTS

| | | | |
|---|---|---|---|
| 4,742,789 | 5/1988 | Pestel et al. | 112/475.05 |
| 4,834,008 | 5/1989 | Sadeh et al. | 112/470.07 X |
| 5,027,726 | 7/1991 | Brower et al. | 112/470.04 X |
| 5,095,835 | 3/1992 | Jernigan et al. | 112/475.05 |
| 5,131,339 | 7/1992 | Goodridge | 112/475.05 |
| 5,205,232 | 4/1993 | Sadeh | 112/475.03 |

*Primary Examiner*—Peter Nerbun
*Attorney, Agent, or Firm*—Silverman, Cass & Singer, Ltd.

[57] ABSTRACT

A sewing system which includes a workholder arranged to hold a part to be sewn; one or more video cameras, such as C.C.D cameras, mounted above the workholder in such a manner that the area of the workholder is totally covered by the combined fields of view of all mounted cameras; a plurality of illuminating lights mounted above and around the table so that illumination can be applied on the part to be sewn by any desired combination of these lights; a frame grabber coupled to one or more cameras and arranged to receive images therefrom and to combine the images into one virtual macro picture; a microcomputer arranged to receive the macro picture from the frame grabber, analyze the macro picture and measure the location of all the edges of the part and its location on the workholder; and a man-machine interface for inputting sewing parameters, such as stitch size, distance from the edge and number of back-tachs, and to generate therefrom a sewing program for sewing the part along its edges.

19 Claims, 3 Drawing Sheets

APPARATUS AND METHOD FOR PREPARATION OF A SEWING PROGRAM

FIELD OF THE INVENTION

The present invention relates to computerized sewing apparatus.

BACKGROUND OF THE INVENTION

Computerized sewing is a well established technology, now in use for more than a decade. A sewing program is prepared mathematically in advance of sewing operations, based on a theoretical part to be sewn. This program is provided to the computerized sewing machine which sews the actual part in accordance with the program.

In computer controlled sewing systems it is known to add edge following capability by means of visual feedback using video cameras mounted on the sewing systems. This is disclosed in U.S. Pat. Nos. 4,784,071, 4,834,008 and 4,932,343, and enables modification of a sewing path, described by a theoretical sewing program, according to the actual position and shape of the sewn part and its edges.

The addition of vision sense to the computer controlled sewing systems enhanced dramatically the accuracy of the sewing process as compared to the results from conventional computerized stitchers. However, a process of designing or writing the sewing program in advance is still required. This process, although it is done today by advanced Computer Aided Design (CAD) means, still takes considerable time and effort and a skilled CAD operator is needed. Occasionally, the CAD system is located far away from the sewing system and the logistics and additional time involved in transferring the sewing program from the CAD system to the sewing system can lead to increased production costs.

The problem is more difficult when modifications are required in the sewing program. An iterative process of returning to the CAD system and changing the program and then testing it again on the computerized stitcher could prove to be a lengthy process indeed.

In addition, with conventional computerized stitchers, a special pallet is required for each shape of piece to be sewn. This pallet is generally formed of aluminum or PVC and is designed to grasp the part to be sewn during the sewing process and includes apertures for passage of the needle along each required seam. Producing this pallet is an expensive and time consuming process.

SUMMARY OF THE INVENTION

It is an object of the present invention to provide a computerized stitcher with incorporated apparatus for learning the shape and position of the parts to be sewn and for preparing, on the spot, a sewing program particularly suitable for the part which is presented to the sewing system.

There is thus provided, in accordance with a preferred embodiment of the present invention, a sewing system which includes a workholder arranged to hold a part to be sewn;

one or more video cameras, such as C.C.D cameras, mounted above the workholder in such a manner that the area of the workholder is totally covered by the combined fields of view of all mounted cameras;

a plurality of illuminating lights mounted above and around the table so that illumination can be applied on the part to be sewn by any desired combination of these lights;

a frame grabber coupled to one or more cameras and arranged to receive images therefrom and to combine the images into one virtual macro picture;

a microcomputer arranged to receive the macro picture from the frame grabber, analyze the macro picture and measure the location of all the edges of the part and its location on the workholder; and a man-machine interface for inputting sewing parameters, such as stitch size, distance from the edge and number of back-tacks, and to generate therefrom a sewing program for sewing the part along its edges.

Further in accordance with the present embodiment, the system may also include a light for illuminating the part from below the transparent table so that the contour of the part is clearly enhanced and viewed by the cameras.

Additionally in accordance with the present embodiment, the sewing system includes apparatus for moving the part from an analysis station to a sewing station for execution of the sewing program.

There is further provided, in accordance with a further preferred embodiment of the invention, a method for generating, in real time, a sewing program for a part to be sewn. The method includes the steps of mounting one or more video cameras above the workholder in such a manner that the area of the workholder is totally covered by the combined fields of view of all mounted cameras;

mounting a plurality of illuminating lights above and around the table so that illumination can be applied on the part to be sewn by any desired combination of these lights;

selectively activating one or more of the cameras and plurality of lights by means of a microcomputer coupled thereto in order to provide a series of images of the part to be sewn;

combining these images into one virtual macro picture by means of a frame grabber;

analyzing the macro picture and measuring the location of all edges of the part and its location on the workholder;

inputting sewing parameters, such as stitch size, distance from the edge and number of back-tacks; and generating therefrom a sewing program for sewing the part along its edges.

According to a preferred embodiment, the method further includes the step of transferring the generated sewing program to a computerized stitcher, as via a data link, and causing the computerized stitcher to execute the program on the part to be sewn.

Most preferably, the method includes the step of moving the part from an analysis station to a sewing station before the step of causing the stitcher to execute the sewing program.

A further object of the invention is to eliminate the need to design and construct a pallet particular to each sewn part in order to hold the individual parts which make up the sewn part during the sewing operation.

There is thus provided, in accordance with a further embodiment of the present invention, a sheet of disposable, substantially non-deformable material, such as a sheet of non-stretchable paper, to which the part to be sewn is attached, either piece by piece or as a complete part, by releasable attaching means such as low power adhesive and which is removable from the sewn part after sewing.

BRIEF DESCRIPTION OF THE DRAWINGS

Further features and qualities of the invention will be clear from the drawings and the description which follows. It should be appreciated that the invention is described herein by way of example only using the drawings to present one preferred embodiment.

DETAILED DESCRIPTION OF THE INVENTION

The present invention relates to computerized multi-directional sewing apparatus having associated therewith a vision system which can measure, analyze and generate an instant sewing program for sewing of a simple part without prior knowledge of the geometry of this part. This vision system includes apparatus for holding firmly a part to be sewn and for locating and measuring all the edges of this part.

The invention further includes apparatus for using the vision system and an image of the part in order to prepare quickly and easily a sewing program even when the part is of complicated geometry. This sewing program includes sewing paths and sewing rules in accordance with a variety of sewing parameters. These sewing paths correspond geometrically to the edges of the part detected by the vision system. The invention provides apparatus for sewing the parts without requiring preparation and use of a special pallet for holding the sewn parts in place.

The sewing system further includes apparatus for transferring the generated sewing program to the computerized sewing apparatus in a form that is readable by the computerized sewing apparatus. It also includes apparatus for picking up the part to be sewn from the vision station "analysis location" and move it to the sewing apparatus.

Figure 1:
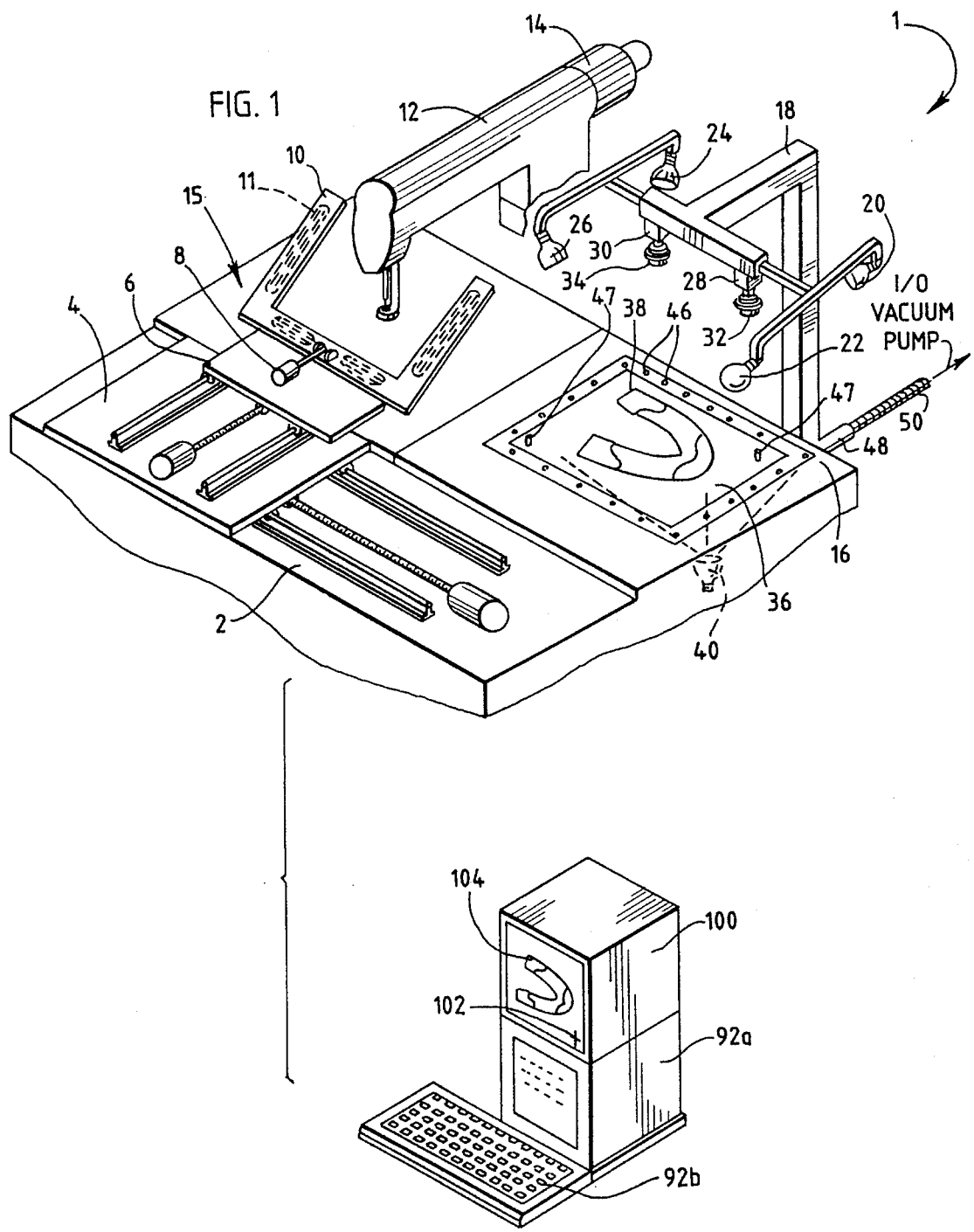
FIG. 1 is a general perspective view illustrating one form of the vision system alongside the computerized sewing apparatus constructed and operative according to the present invention.

Referring now to FIG. 1, there is shown a computerized sewing system, referenced generally 1, constructed in accordance with an embodiment of the present invention. The sewing system 1 includes a table 2 onto which a sewing head 12 is mounted. A two-dimensional manipulator, referenced generally 15, is provided for holding the part to be sewn firmly in a workholder or picking frame, referenced 10, and for moving the part relative to the sewing head 12 in a horizontal plane. In the illustrated embodiment, the manipulator 15 takes the form of an X–Y table having an upper carriage 6 mounted onto a lower carriage 4. Both upper carriages 6 and lower carriage 4 are moved by means of ball screws and slides and which are all mounted on table 2. The manipulator 15 is further adapted to reach the part when it is placed on an adjacent loading and measuring table, referenced 16.

Picking frame 10 is mounted onto upper carriage 6 and is adapted to be selectably lifted or lowered relative to tables 15 and 16 by means of a pneumatic or other actuator 8. Frame 10 is preferably coated on its lower side with high friction material 11, such as sand paper, thereby to firmly hold down the sewn part. Sewing head 12 is operated by motor 14 while the X–Y table 15 moves the sewn part underneath the needle, thereby enabling sewing operations.

A microprocessor is provided for controlling the manipulator and sewing head 12 and for moving the sewn part in its workholder, relative to the sewing head, executing a sewing program which is stored in the memory of the microprocessor.

Table 16 holds the part to be sewn during preparation of the sewing program. Table 16 is a flat table having a predetermined geometrical position within the computerized sewing system 1. Viewing means 28, 30, preferably one or several video cameras, such as C.C.D cameras, are mounted on a rigid fixture above the loading table in such manner that the table's area is totally covered by the combined fields of view of all mounted cameras. Viewing means 28, 30 are capable of converting the picture of the part to be sewn to digital data which can be manipulated by an image processor.

A plurality of illuminating lights, referenced 20, 22, 24 and 26, are mounted onto a support 18 above and around the table so that the part 38 to be sewn can be illuminated by any desired combination of these lights. Illumination from above is provided from various diagonal directions and is required when one part to be sewn in located on top of another part to which it is to be sewn. In this case, the edges of the top part relative to the bottom part are important for determining the sewing program.

Alternatively, or in addition, an illumination source 40 is provided which directs its illumination from below onto loading table 16 which preferably is made of translucent or semi-transparent material. Thus, diffused light is generated as a background for the part being analyzed, providing back lighting in cases where the external edges of the part are of interest for purposes of the sewing program. All these illuminating lights are controllable by the microprocessor to selectively illuminate the table from any desired direction and with any desired intensity.

In the illustrated embodiment, two cameras 28 and 30 having lenses 32 and 34 respectively, are mounted onto a rigid support 18 above the loading table 16. The position of the cameras and the lenses are so chosen to provide a complete coverage of the area of the pallet with an appropriate overlap between the fields of view of the cameras. It will be appreciated that any number of cameras can be utilized, from one to whatever number is desired.

Optionally, additional cameras can be added to provide better resolution inside the field of view, depending on the required resolution, the total field of view and the resolution of the selected cameras.

Preferably, illumination sources 20, 22, 24 and 26 are directed towards the combined field of view of all the cameras viewing loading table 16, preferably in such a way that each source illuminates the complete area of loading table 16.

The part 38 to be sewn is placed flatly on loading table 16. Part 38 is attached, preferably to a sheet of a non-deformable material 36. Sheet 36, holding the part 38, is then placed on loading table 16 and is held in place by suction air flow applied through air nozzles 46 by a vacuum pump 145 (FIG. 2), or by any other suitable means, for the duration of the analysis operation.

Figure 2:
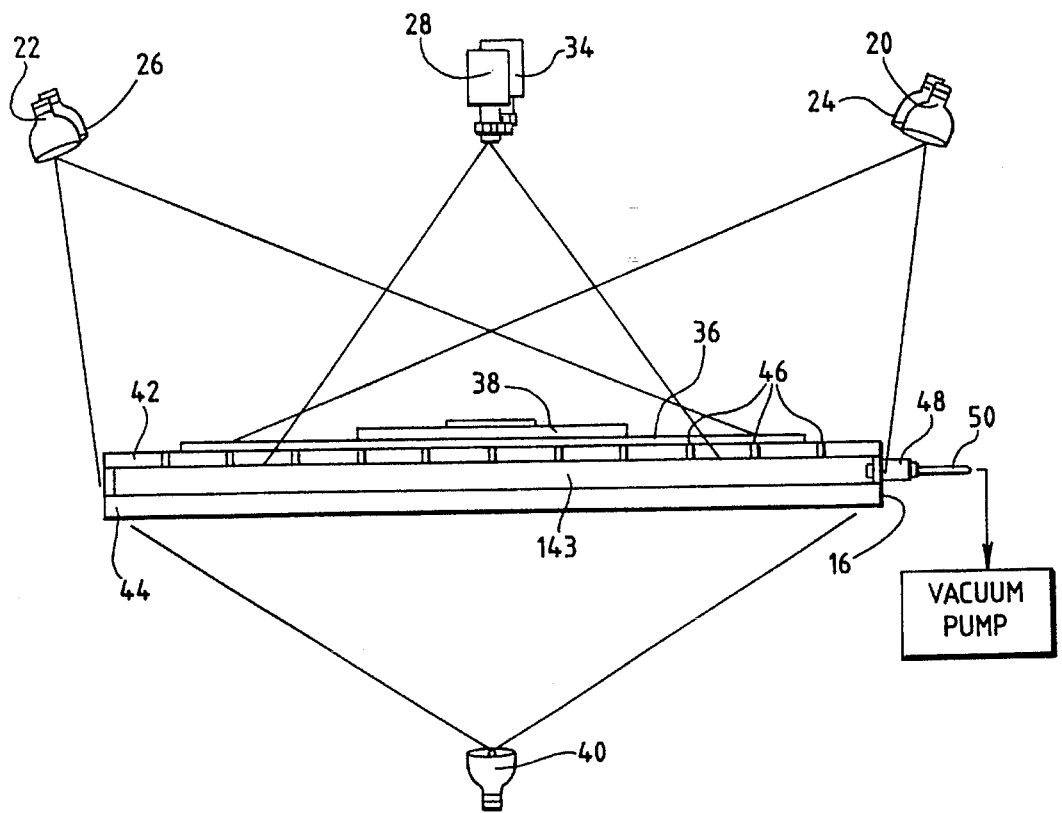
FIG. 2 is a frontal cut view of the vision system of FIG. 1.

FIG. 2 is a front sectional view of the construction of the loading table 16 and illustrates the relative orientation of the cameras 28 and 24, the lights 20, 22 24 and 26, and the construction of loading table 16.

Preferably, loading table 16 is constructed from transparent material, such as plastic or glass. Its upper plate 42 is formed with small openings or bores 46 which communicate with a cavity 143 which is formed between plates 42 and 44. An air nozzle 48 is attached to cavity 143, such that air may be sucked through holes 46 and cavity 143 by a vacuum pump 145 connected to nozzle 48 by pipe 50. Sheet 36 and therefore also part 38 which is attached to sheet 36, may thus be held down via a suction force, applied as described above, flat on loading table 16.

FIG. 2 further shows the diagonal orientation of lights 20, 22, 24, 26 relative to table 16 and the position of light 40 below the transparent table 16. FIG. 2 further shows the generally vertical position of cameras 28 and 30 above loading table 16 and their fields of view.

Figure 3A:
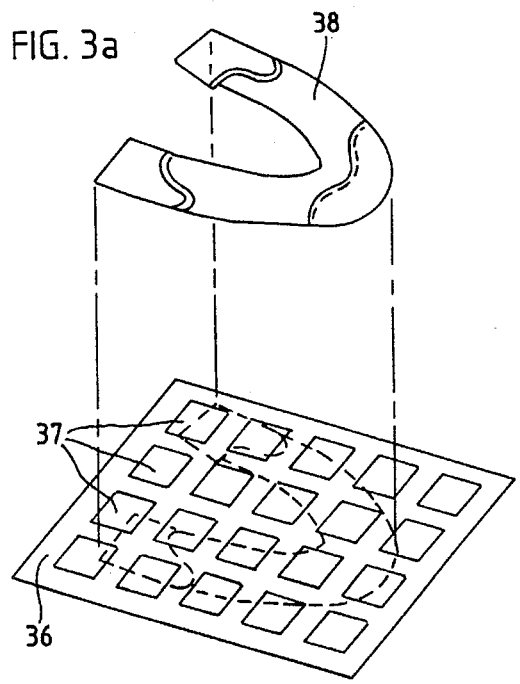
FIGS. 3a–3c show method steps of placement of a sewn part on a fixing layer, seen in FIGS. 1 & 2.
Figure 3B:
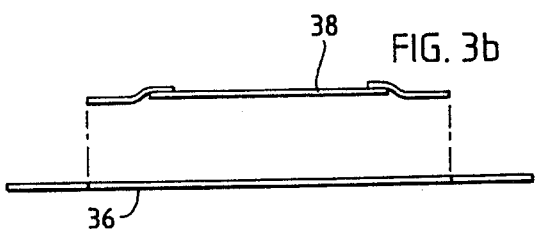

FIGS. 3a & 3b illustrate a preferred embodiment constructed in accordance with the present invention wherein the sewn part 38 is mounted on a disposable sheet 36, instead of on a conventional rigid pallet. Sheet 36 is made of material, such as paper, which is not deformable geometrically in the plane, thus is able to maintain its position and shape during the sewing operation. Hence, when frame 10 moves sheet 36 during the sewing operation, part 38 which is fully attached to sheet 36 by means such as low bonding power adhesive (type 75 made by 3M Corp. is suitable), does not deform or move relative to the frame as compared to its initial condition when picked from loading table 16 by frame 10 (shown in FIG. 1). After sewing part 38 together with sheet 36, sheet 36 can be torn away leaving only the sewn part 38. Sheet 36 can be made with large holes 37 in it so that it is still stiff enough to hold part 38 on it and yet easy to remove after the sewing operation.

Figure 3C:
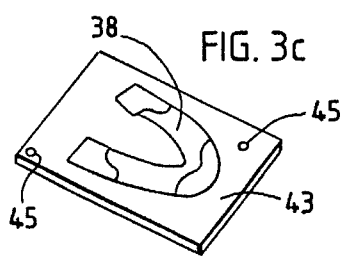

FIG. 3c illustrates yet another embodiment constructed according to the present invention, wherein part 38 is placed on a rigid pallet 43. Rigid pallet 43 may be any known pallet that is used to carry the sewn part by the computerized sewing apparatus during the sewing operation. Pallet 43 can be placed precisely on table 16 using locating means such as holes 45 which are precisely mountable on table pins 47 (FIG. 1) when placing the pallet on table 16.

Figure 5:
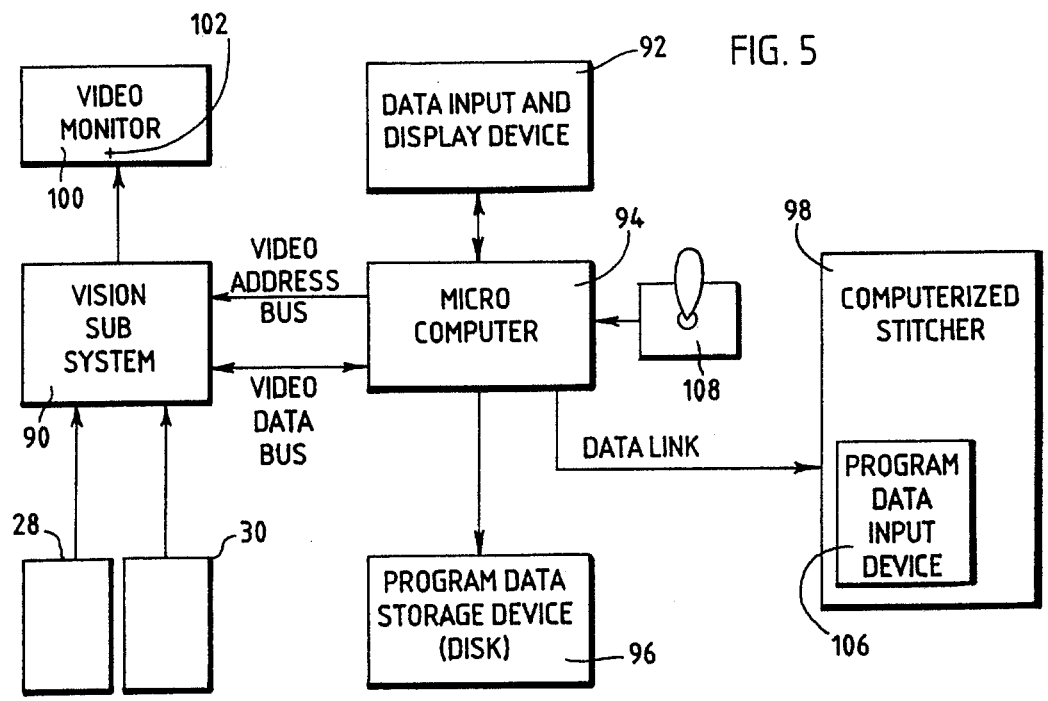
FIG. 5 is a general block diagram of the vision system including the apparatus for setting of the sewing parameters and the sewing program interface link to the computerized sewing apparatus.

Referring now to FIG. 5, it is seen that cameras 28 and 30 are connected to a vision subsystem 90 (also called frame grabber by those skilled in the art) which is capable of storing one or more pictures taken by any of the cameras and which is further capable of manipulating these pictures so as to obtain one combined, virtual macro picture. Examples of such manipulation include summing, subtracting, and selecting data of corresponding pixels in different pictures.

Microcomputer 94 is connected to vision subsystem 90 and is adapted to control the sequence by which pictures are taken by various cameras, the sequence by which the various lights illuminate the part 38 which is placed on the loading table, and the intensity of each light. This microcomputer further receives the macro picture after it is generated by the vision subsystem 90 and analyzes it and measures the location of all the edges of the part and its location on the loading table.

Preferably, microcomputer 94 is also connected to a data input device or "man-machine interface" through which sewing parameters can be introduced to the system, and is further connected to a display device on which these sewing parameters are displayed. These two devices may be incorporated into a single device, seen in FIG. 5 as data input and display device 92 or, alternatively, may be constituted separately, by a keyboard 92b and computer display 92a (FIG. 1).

Figure 4:
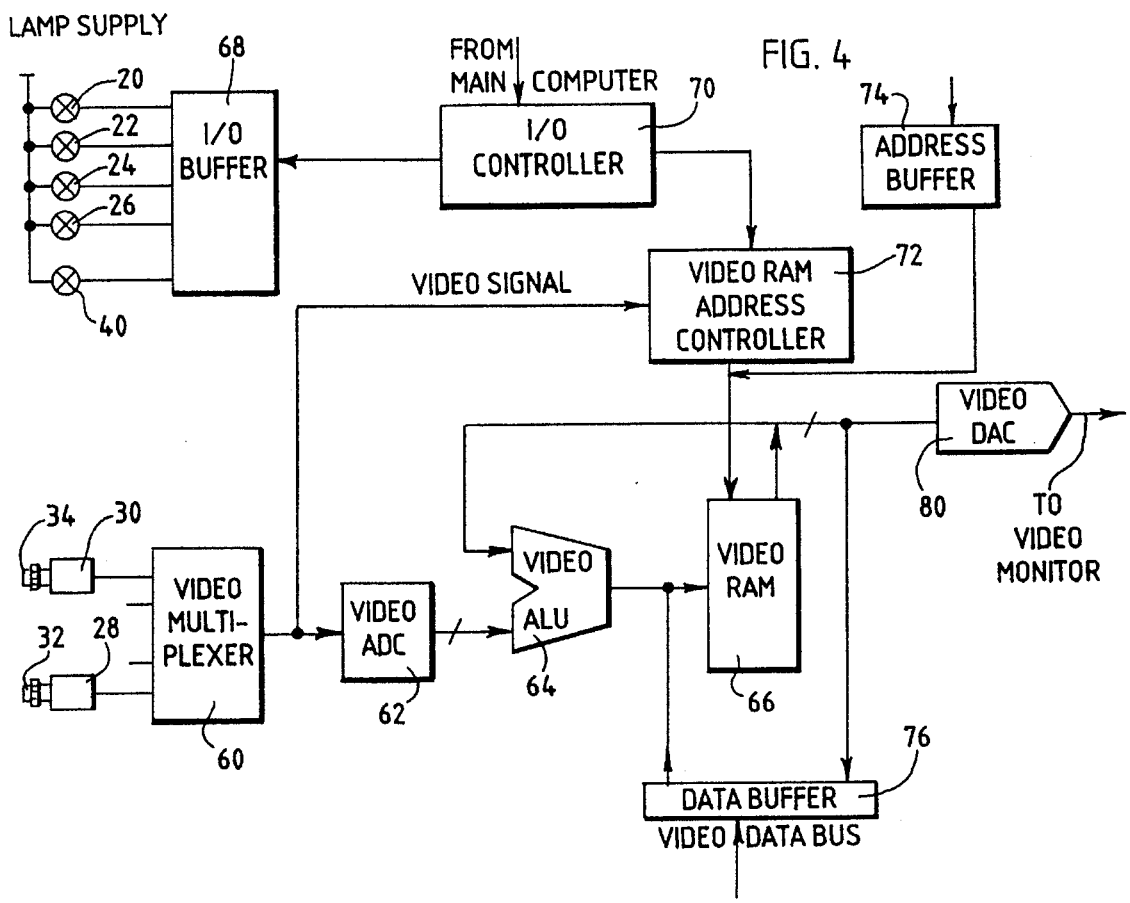
FIG. 4 is a block diagram representation of the construction of the data acquisition and analysis of the pictures, in accordance with the present invention.

FIG. 4 is a detailed block diagram illustration of the vision subsystem 90 of FIG. 5, constructed in accordance with an embodiment of the present invention. It is seen that cameras 28 and 30 are connected to a video multiplexer 60 which transfers the video signal from the selected camera to a video ADC (analog to digital converter) 62. The video data in its digital form is then transferred, pixel after pixel, to a video ALU (arithmetic logic unit) 64. Each pixel is processed against the corresponding pixel in another picture, taken under different lighting conditions, which is stored in a video RAM (random access memory) 66. This processing may be adding them together, subtracting one from the other, selecting only the higher value (lighter) or the lower value (darker) in accordance with the type of material, the color of the edge, and so forth. The microcomputer 94, to which video RAM 66 is connected and which governs the processing, determines the optimal process, taking into account the input values.

The result is saved in video RAM 66 at the same pixel memory location. This way, the picture stored in video RAM 66 is continuously updated by input resulting from each new picture, such that the video RAM contains a new picture which is a synthesis of all the pictures taken by the same camera under different lighting conditions. By way of example and explanation as to the different pixel processing which may be selected, selection of the lower (darker) value results in a synthesized picture which enhances all the edges of the part 38 by showing the shadow generated by them under the illumination in all directions.

The connection of video RAM 66 to microcomputer 94 (FIG. 5) is via address buffer 74 for the address bus and data buffer 76 for the video data bus. Data provided as output from video RAM 66 is transferred also to a video DAC (digital to analog converter) 80 which is connected to a video monitor 100 (shown in FIG. 1) so that the synthesized picture stored in the video RAM 66 at any stage is presented to the operator for viewing.

The illuminating light or lights for each picture are selected by I/O (input/output) controller 70, and are turned on or off, as required, by I/O buffer 68. I/O controller 70 further detects the video synchronization pulses in the video signal received from video ADC 60 (device Bt251 by Brooktree Corp. of San Diego, Calif., U.S.A., for example executes this function) and sets the address in the video RAM 66 to where each pixel data should be stored.

Referring now also to FIG. 5, it is seen that video monitor 100 (FIG. 1) is connected to video RAM 66 through video DAC 80. Hence the monitor displays the picture stored in video RAM 66 continuously. Microcomputer 94 is connected to vision subsystem 90 via address bus and data bus enabling it to read or write to or from any of the locations of the video RAM 66. Since there is an exact relation between the location of a picture element in the video RAM 66 and the location of this element on the part 38 which is on loading table 16, microcomputer 94 can analyze the data and determine the location and dimension of each edge in the combined picture using edge detection algorithms known in the art.

Microcomputer 90 further receives sewing parameters, from the operator, via the above-described man-machine interface or data input and display device 92. These sewing parameters include: stitch size, distance of seam from edge, number of back-tacks at the beginning and end of the seam and number of seams parallel to each edge.

Microcomputer 94 is operative to generate a sewing program based on the analyzed picture and the sewing parameters. The resulting sewing program which fits a given part 38 to be sewn is transferred to sewing program input device 106 of computerized stitcher 98, preferably via a data link. Sewing program input device 106 is adapted to replace prior art sewing program storage devices conventionally employed by known types of computerized stitcher 98 PROM (Programmable read only memory), EPROM (Erasable programmable read only memory), and EEPROM (Electrically erasable programmable read only memory) devices are among prior art sewing program storage devices.

Microcomputer 94 is further connected to a cursor manipulation device 108 (such as a commercially available joy-stick). Device 108 is used to cause the movement of a small visible cross (cursor) 102 on the video picture displayed on video monitor 100. Hence, by placing cross 102 on any picture element, the operator indicates to microcomputer 94 the location of particular edges, corners or other important locations on part 38 whose image 104 is shown on video monitor 100. Using this pointing method, the operator defines the order by which the generated sewing program should perform the seams which are related to the various edges of part 38.

Microcomputer 94 is further connected to a magnetic storage device (such as a floppy diskette) in which it optionally stores the generated sewing program for future sewing of part 38. In this case, it will be appreciated that the sewing program is stored together with a coded identification tag, such as a number, which is also attached to the particular part to be sewn by any suitable means. Hence this particular part can be placed any time later on the computerized stitcher and the corresponding sewing program can be retrieved from program storage device 96 by identifying the coded identification tag with that of the program.

Operation of the sewing apparatus and vision system of the present invention is as follows.

As seen in FIG. 1, a part 38 to be sewn is mounted on holding table 16 for analysis. Microcomputer 94 (FIG. 5) selectively activates the CCD cameras 28 and 30 and the lights 20, 22, 24, 26 and 40 in order to provide a series of images of the part to be sewn, each with a different section of the edge of the part being enhanced due to the direction of illumination. Lights 20, 22, 24, 26 and 40 are thus operated sequentially.

For each different illumination state, when a different edge section of part 38 is enhanced, a picture is taken by each camera. The pictures are stored successively in the memory of the vision subsystem, and are combined by the vision subsystem into one virtual macro picture. The macro picture is analyzed by the microcomputer 94 which measures the location of all the edges of the part 38 and its location on the workholder.

The operator inputs the particular sewing parameters for part 38, such as, stitch size, distance from the edge and number of back-tacks, and the microcomputer 94 generates a sewing program for sewing that particular part along its edges.

The generated sewing program is transferred to a computerized stitcher, either via a data link in real time or via a diskette or other off-line means. The part is transferred from the loading table 16 or from a holding location to the X–Y table 15 of the sewing apparatus, and the computerized stitcher executes the program by sewing the part to be sewn.

For a very simple part, such as a square or circle, the designer need not input any particular data. The microcomputer 94 operates to locate the edges and, in light of the programmed parameters, generates an appropriate sewing pattern. For a more complicated part, wherein, inter alia, the sequence of sewing operations is important, an operator might have to input specific details of the part and a program will be prepared on a sample part. To sew another part which is similar, the computer merely corrects the sewing path according to the actual part and deformation.

It should be appreciated by those skilled in the art that is not limited to what has been shown and described herein above by way of example. Rather, the invention is limited solely by the claims that follow.

We claim:

1. A vision system for real time analysis of a part to be sewn prior to sewing in a computerized stitcher comprising:

illumination means for sequentially illuminating said part in such a way as to enhance at least a portion of an edge thereof during each illumination;

at least one camera for generating an image of all of said part during each illumination thereof; and processor means arranged to receive said images from said camera for pixel level analysis and image enhancement of said images and to provide a single image of all of said part with all its edges enhanced.

2. For use in conjunction with and prior to sewing on a computerized sewing system, sewing program generating apparatus comprising:

a workholder for holding a part to be analyzed and sewn;

illumination means for sequentially illuminating said part in such a way as to enhance at least a portion of an edge thereof during each illumination;

at least one camera for generating an image of all of said part during each illumination thereof;

an image processor having means to receive said images from said camera for pixel level analysis and image enhancement of said images and to provide a single image of all of said part with all its edges enhanced; and a microcomputer having means to receive said single image from said image processor and to generate, in accordance with the edges so detected, a sewing program for sewing said part.

3. Sewing program generating apparatus according to claim 2 and wherein said sewing program is generated in accordance with predetermined sewing parameters.

4. Sewing program generating apparatus according to claim 2, further comprising an operator activated data input means and wherein said sewing program is generated in accordance with sewing parameters input by an operator.

5. Sewing program generating apparatus according to claim 2, and wherein said illumination means is disposed above said workholder.

6. Sewing program generating apparatus according to claim 2, and wherein said workholder is translucent and said illumination means is disposed beneath said workholder.

7. Sewing program generating apparatus according to claim 2, and further comprising:

a cursor manipulation device for providing input to said microprocessor; and means in said microprocessor for adjusting said sewing program in accordance with said input.

8. Sewing program generating apparatus according to claim 2, and further comprising data link means for transferring said generated sewing program to said computerized sewing system in a form that is readable and recognizable thereby, for execution by said sewing system.

9. Sewing program generating apparatus according to claim 2, and further comprising means for transferring said workholder to said computerized sewing system.

10. Sewing program generating apparatus according to claim 2, and wherein said camera means comprises a plurality of video cameras arranged to cover all of the area of said workholder and so as to have overlapping zones between the fields of view of each camera, said cameras being coupled for activation by said microcomputer in order to enable selectable viewing of the part by any of said cameras.

11. Sewing program generating apparatus according to claim 2, and wherein said workholder is mounted on a loading table, and also comprising holding means for holding the viewed part firmly in place on said loading table.

12. Sewing program generating apparatus according to claim 11, and wherein said holding means comprises air suction means.

13. A method for generating a sewing program comprising:

mounting a part to be analyzed and sewn in a workholder;

sequentially illuminating the part from different diagonal directions in such a way as to enhance at least a portion of the edge thereof with each different illumination;

scanning the part during each different illumination to generate a sequence of images of the part;

analyzing said sequence of images and performing edge enhancement and providing therefrom a single image with all edges enhanced; and generating a sewing program comprising sewing paths and sewing rules for sewing the part in accordance with the edges in said single image.

14. A method according to claim 13 and further comprising the step of inputting sewing parameters before said step of generating.

15. A method according to claim 13, and further comprising the step of inputting sewing parameters after said step of generating a sewing program, and generating an adjusted sewing program in accordance with said parameters.

16. A method according to claim 13, and wherein said step of mounting comprises attaching the part to a pallet formed of a disposable sheet of substantially non-deformable material by releasable attaching means, such as adhesive spray, and said method further comprises the steps of:

sewing the part in accordance with said sewing program; and removing said non-deformable material from the sewn part, after said step of generating.

17. A method according to claim 16, and wherein said step of attaching includes the sub-step of applying an adhesive spray to at least one of the pallet and the part.

18. A system as claimed in claim 2 including a pallet for holding a part to be sewn during analysis and sewing in a computerized stitcher comprising:

a flat sheet of substantially non-deformable material mounted in a frame;

releasable adhesive means for releasably coupling the part to said sheet.

19. A pallet according to claim 18, and wherein said substantially non-deformable material comprises paper.

* * * * *